United States Patent [19]

Kooy

[11] Patent Number: 4,458,501
[45] Date of Patent: Jul. 10, 1984

[54] CABINET FOR CUT OFF FLOWERS

[76] Inventor: Hermen Kooy, No. 46, Stommeerkade, 1431 EK Aalsmeer, Netherlands

[21] Appl. No.: 403,050

[22] Filed: Jul. 29, 1982

[30] Foreign Application Priority Data

Jun. 16, 1982 [NL] Netherlands .......................... 8202449

[51] Int. Cl.³ .............................................. A47F 3/04
[52] U.S. Cl. ..................................... 62/256; 312/116; 312/236
[58] Field of Search ...................... 211/71, 74; 62/256; 312/114, 236, 116

[56] References Cited

U.S. PATENT DOCUMENTS

| 1,001,416 | 8/1911 | Lloyd | 211/74 |
| 2,279,484 | 4/1942 | Munshower | 62/256 |
| 3,593,538 | 7/1971 | Bachman | 62/256 |
| 3,696,630 | 10/1972 | Bressickello | 62/256 X |
| 3,760,534 | 9/1973 | Choux et al. | 211/71 |

FOREIGN PATENT DOCUMENTS 377632 1/1960 Switzerland ........................... 62/256

Primary Examiner—Victor N. Sakran
Assistant Examiner—Joseph Falk
Attorney, Agent, or Firm—Diller, Ramik & Wight

[57] ABSTRACT

Cabinet, in which cut-off flowers are cooled by cooling the flower boxes in which the flowers are put.

8 Claims, 3 Drawing Figures

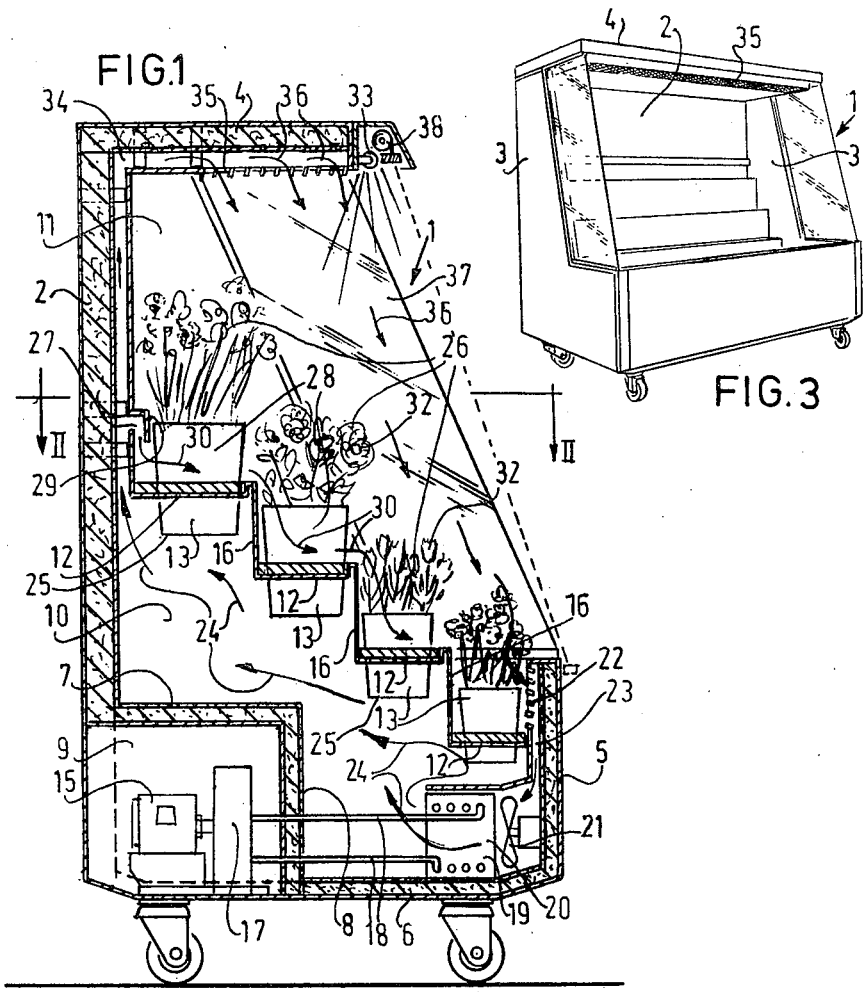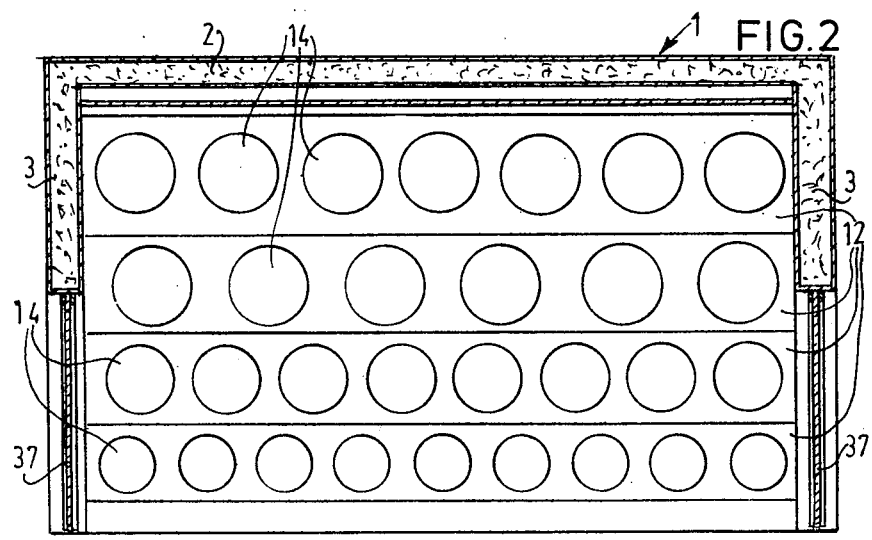

CABINET FOR CUT OFF FLOWERS

The invention relates to a cabinet for cut-off flowers, comprising at least one table to support flower boxes, a flower space bounded by cabinet walls and said table and comprising a cooling equipment.

Such a cabinet is known. In the known cabinet cold air is blown into the flower space so that the flowers stand in draught and wither.

The object of the invention is to provide a cabinet wherein the cut-off flowers can be kept well preserved so that they remain fresh for a much longer time.

To this aim the table has been provided with openings for receiving flower boxes, said openings admitting the flower boxes to extend through said openings into a cooling space.

In the cabinet according to the invention the flowers are cooled by cooling the water in the flower boxes in which the flowers have been put. In consequence thereof, a considerable cooling of the flowers can be realized, without, in an intolerable way, having the flowers stand in a draught.

Preferably, the cooling space opens via a cold air exhaust into the flower space at the level of the top side of the flower boxes. Thus even the flower space is considerably cooled by the cold air flow, streaming along the flower boxes below the flower heads, so that the flower heads are not struck by the cold air flow. In this way the flower boxes are specially cooled.

If the cooling space not only opens into the flower space on a low level, at the top side of the flower boxes, but also on a high level with a small cold air exhaust, only a small quantity of cold air is admitted in the top side of the flower space. This small quantity, however, does not cause an intolerable draught. On the other hand this cold air flow ensures the total flower space to stay fresh.

The mentioned and other features of the invention will be explained in the following description by reference to a drawing.

The drawing shows in:

FIG. 1 a vertical cross section through a preferred embodiment of the cabinet according to the invention, FIG. 2 a horizontal cross section over line II—II of FIG. 1, and FIG. 3 on a smaller scale a perspective view of the cabinet of FIG. 1.

The cabinet 1 has isolating walls, namely a back wall 2, side walls 3, a top wall 4, a front wall 5, a bottom wall 6, and intermediate walls 7 and 8. The intermediate walls 7 and 8 separate a motor space 9 from cooling space 10. The cooling space 10 is separated from a flower space 11 by means of a series of tables 12 and vertical strips 16, mounted between the tables 12 and adjoining same. The horizontal tables 12 are amphitheatrically arranged. The tables 12 are provided with openings 14 permitting flower boxes 13 to reach through said openings 14 into the cooling space 10. Preferably the flower boxes 13 are conical and consist for instance of pails. Their outer diameter is preferably chosen so, that the major part of the flower boxes reaches into the cooling space 10 and a top part only protrudes above the tables 12. The flower boxes 13 and the openings 14 of the most backward and highest table 12 are preferably the largest and their dimensions decrease stepwise in the direction of the lowest front table 12 (see FIG. 2).

The motor area 9 houses a motor 15 and a compressor 17 of the cooling equipment driven by said motor 15. The compressor 17 is connected through conduits 18 to an evaporator 19 opening into the cooling space 10. The inlet 20 of the evaporator (cooling coil) 19 is provided with a ventilator 21 sucking air from the flower space 11 through a channel 23 and a grid 22. The cold air flows from the evaporator 19 as indicated by arrows 24 through the cooling space 10 and thus along the lower ends 25 of the flower boxes 13, thereby considerably cooling the water in the flower boxes 13 and consequently the flowers 26, standing in the water.

The cooling space 10 opens via a cold air exhaust 27 at the level of the top ends 28 of the flower boxes 13 into the flower space 11. The cold air exhaust 27 consists of a narrow horizontal slit extending mainly over the length of the cabinet 1. The exhaust 27 bears a downwardly directed guiding strip 29, aiming the cold air flow as indicated by arrows 30 downwardly over the tables 12 along the top ends 28 of the flower boxes 13, and thus below the flower heads 32 of the flowers 26, standing in the flower boxes, in the direction of the cold air outlet, consisting of a grid 22.

At the inner side of the back wall 2 and top wall 4 an air channel 34, extending along the length of the cabinet 1, has been arranged, through which channel 34 a small quantity of cold air is introduced through a grid 35 in the top part of the flower space 11 according to arrows 36. This small quantity of cold air is just sufficient to keep the flower space 11 cool without causing an inadmissable cold air stream along the flower heads 32. The flower space 11 is bounded by isolated walls 2, 3 and 4 and the tables 12 with strips 16 and further by glass sheets 37, while the front side of the flower space 11 is open, so that the flowers are well visible and can be easily reached. In order to close the flower space 11 at night, a roller curtain 38 has been installed; the lines indicate the position of the roller curtain when it covers the front side of the cabinet 1. The top wall 4 has been provided with an illumination equipment 33.

What I claim is:

1. A device for displaying and preserving flowers, which comprises:

a cabinet having back, bottom, side and front walls and table means cooperating with said walls to define a cooling space below said table means and a flower space above said table means, said table means having openings therein and there being a flower box closing each opening and having a bottom portion projecting below said table means into said cooling space, said flower boxes being adapted to contain water and flowers therein; and cooling means in said cooling space for preserving said flowers principally by cooling the water in those portions of the flower boxes which project into said cooling space and secondarily by directing cooling air from the cooling space into said flower space without subjecting the flowers to significant draft of cooling air, whereby the flowers remain fresh for periods of time much longer than if the flowers are cooled principally by cooling air in said flower space which subjects the flowers to significant draft of cooling air.

2. A device as defined in claim 1 wherein said cooling means includes a cooling coil in said cooling space and an air circulation fan directing air from outside said cooling space and past said cooling coil into said cooling space, said cooling space having a cooling air outlet remote from said cooling coil, and passage means leading from said cooling air outlet into said flower space.

3. A device as defined in claim 2 wherein said cabinet includes a top wall spaced above and overhanging said table means, and said passage means including a perforate wall underlying said top wall to direct cooling air from the cooling space downwardly into said flower space.

4. A device as defined in claim 2 wherein said bottom wall is stepped to converge with said back wall to provide an exterior equipment space at the bottom and back of said cabinet, and refrigerating means in said equipment space and connected to said cooling coil.

5. A device as defined in claim 3 wherein said cabinet includes a top wall spaced above and overhanging said table means, and said passage means including a perforate wall underlying said top wall to direct cooling air from the cooling space downwardly into said flower space.

6. a device as defined in claim 1, 2, 3, 4 or 5 wherein said side walls include transparent wall portions projecting above said table means to aid in projecting and preserving the flowers while aiding in their being viewed.

7. A device as defined in claim 2, 3, 4 or 5 wherein said table means is stepped from said front wall to converge upwardly toward said back wall whereby the upper surface defining said cooling space is likewise upwardly stepped, said cooling coil being located in said cooling space adjacent the juncture between said bottom wall and said front wall.

8. A device as defined in claim 7 wherein said cooling air outlet is located adjacent the convergence of said table means and said back wall.

* * * * *